United States Patent
Hemphill et al.

(10) Patent No.: US 10,207,623 B1
(45) Date of Patent: Feb. 19, 2019

(54) PORTABLE ENTERTAINMENT SUPPORT SYSTEM FOR A PICKUP TRUCK BOX

(71) Applicant: Ford Global Technologies, LLC, Dearborn, MI (US)

(72) Inventors: Joshua Robert Hemphill, White Lake, MI (US); Jack Marchlewski, Saline, MI (US); Dragan B. Stojkovic, Taylor, MI (US); Jeffrey Gray, Dearborn, MI (US); Robert Reiners, Grosse Ile, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 38 days.

(21) Appl. No.: 15/670,498

(22) Filed: Aug. 7, 2017

(51) Int. Cl.
| | |
|---|---|
| *B60P 3/025* | (2006.01) |
| *B60P 7/135* | (2006.01) |
| *B60P 7/08* | (2006.01) |
| *B60R 11/02* | (2006.01) |
| *B62D 33/02* | (2006.01) |
| *F16M 11/04* | (2006.01) |

(52) U.S. Cl.
CPC .......... *B60P 3/0255* (2013.01); *B60P 7/0807* (2013.01); *B60P 7/135* (2013.01); *B60R 11/0235* (2013.01); *B62D 33/0207* (2013.01); *F16M 11/04* (2013.01); *F16M 2200/06* (2013.01)

(58) Field of Classification Search
CPC .... B60P 3/025; B60P 3/0255; B60R 11/0235; B62D 33/0207; B62D 33/023; F16M 11/04
USPC ............................................ 296/21, 37.6, 43
See application file for complete search history.

(56) References Cited

U.S. PATENT DOCUMENTS

| | | | |
|---|---|---|---|
| 5,238,281 A | 8/1993 | Chen | |
| 5,281,985 A | 1/1994 | Chan | |
| 6,145,230 A * | 11/2000 | Holmberg | G09F 21/04 296/21 |
| 8,529,176 B2 | 9/2013 | Jutila et al. | |
| 8,882,419 B2 * | 11/2014 | Aguirre | B60P 7/0807 410/106 |
| 9,278,717 B2 | 3/2016 | Barthelemy et al. | |
| 9,610,887 B1 | 4/2017 | Parra Becerra | |
| 9,630,548 B2 | 4/2017 | Marchlewski et al. | |
| 2005/0060921 A1 | 3/2005 | Glynn | |
| 2018/0141499 A1 * | 5/2018 | Newman | B60R 11/0235 |

* cited by examiner

*Primary Examiner* — Jason S Daniels
(74) *Attorney, Agent, or Firm* — Brooks Kushman P.C.

(57) ABSTRACT

An entertainment support system is attached to a pickup truck having a plurality of receptacles in sidewalls of a truck box spaced above a truck bed. The entertainment support system includes a first mount having a first horizontal arm extending between opposing sidewalls of the truck box, and a vertical arm extending orthogonal to the first horizontal arm. The entertainment support system further includes a second mount including a second horizontal arm extending between the opposing sidewalls parallel to and spaced from the first horizontal arm.

20 Claims, 5 Drawing Sheets

PORTABLE ENTERTAINMENT SUPPORT SYSTEM FOR A PICKUP TRUCK BOX

TECHNICAL FIELD

This disclosure relates to a pickup truck box and a portable entertainment support system for a pickup truck box having an accessory interface system.

BACKGROUND

Trucks for transporting cargo are well known and are widely used in business and for recreation. Some truck owners customize the pickup truck box to provide convenient interface points for tie downs that are used to secure tools, motorcycles, recreation vehicles, containers, or other cargo. Some pickup truck owners may drill holes in the pickup truck box or use existing holes or other structural features such as edge flanges or the top end of the bed wall to provide interface points for accessories. Drilling holes in a pickup truck box may increase the extent of corrosion, disrupt the integrity, and reduce the strength of the structure. Using existing structural features to secure objects to a pickup truck box may not meet all of a user's needs and requirements.

SUMMARY

In at least one approach, an entertainment support system is attached to a pickup truck having a plurality of receptacles in sidewalls of a truck box spaced above a truck bed. The entertainment support system may include a first mount having a first horizontal arm extending between opposing sidewalls of the truck box, and a vertical arm extending orthogonal to the first horizontal arm. The entertainment support system may further include a second mount including a second horizontal arm extending between the opposing sidewalls parallel to and spaced from the first horizontal arm.

The second horizontal arm may be spaced from the first horizontal arm along a length of the truck box.

The first horizontal arm may be, for example, a first telescoping horizontal arm adjustable between a first length and a second length. The first telescoping horizontal arm may comprise a first base member and a second base member slidably adjustable relative to the first base member.

The second horizontal arm may be a second telescoping horizontal arm adjustable between a third length and a fourth length. The second telescoping horizontal arm may comprise a third base member and a fourth base member slidably adjustable relative to the third base member. The second length and the fourth length substantially correspond to a width of the truck box.

The vertical arm may be a vertical telescoping arm adjustable between a fifth length and a sixth length. The vertical telescoping arm may comprise a first vertical member and a second vertical member slidably adjustable relative to the first vertical member. The first mount further may comprise a transverse arm secured to the vertical arm and extending substantially parallel to the first horizontal arm. The transverse arm may include at least one securement member adapted to support a display device.

The first horizontal arm and the second horizontal arm may include hooks adapted to engage the receptacles of sidewalls of the truck box spaced above the truck bed such that the first horizontal arm and the second horizontal arm are spaced above the truck bed. The receptacles may include an interface plate secured to a sidewall. The interface plate may include a central body spaced apart from a recess in the sidewall. The hooks may be adapted to engage the central body.

The second horizontal arm may include a first mount adapted to support a video source device and a second mount adapted to support an audio device.

In at least one approach, a method of securing a portable entertainment system with a pickup truck including sidewalls having receptacles and a truck bed between the sidewalls includes securing opposing ends of a first mount to a first set of opposing receptacles and above the truck bed. The method may further include securing opposing ends of a second mount to a second set of opposing receptacles parallel to and spaced from the first mount and above the truck bed.

The method may further include slidably adjusting a first base member of the first mount relative to a second base member of the first mount to extend a length of a first horizontal arm of the first mount. The method may further include slidably adjusting a first vertical member of a vertical arm of the first mount relative to a second vertical member of the first mount to extend a height of the vertical arm.

The method may further include securing a display device to a transverse arm of the first mount, the transverse arm extending substantially orthogonal to the vertical arm. The method may further include slidably adjusting a third base member of the second mount relative to a fourth base member of the second mount to extend a length of a second horizontal arm of the second mount.

The method may further include securing a video source device to the third base member, and securing an audio device to the fourth base member.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
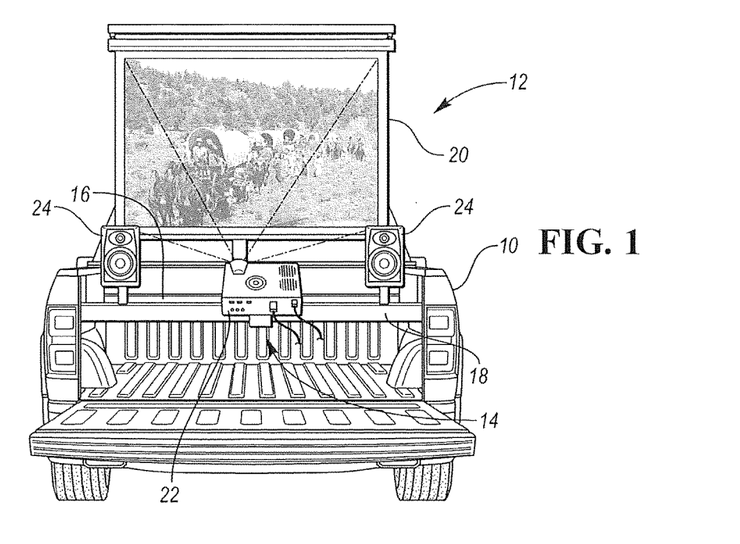
FIG. 1 is rear elevation view of a pickup truck having an audio-visual support system with audio-visual components secured thereto.
Figure 2:
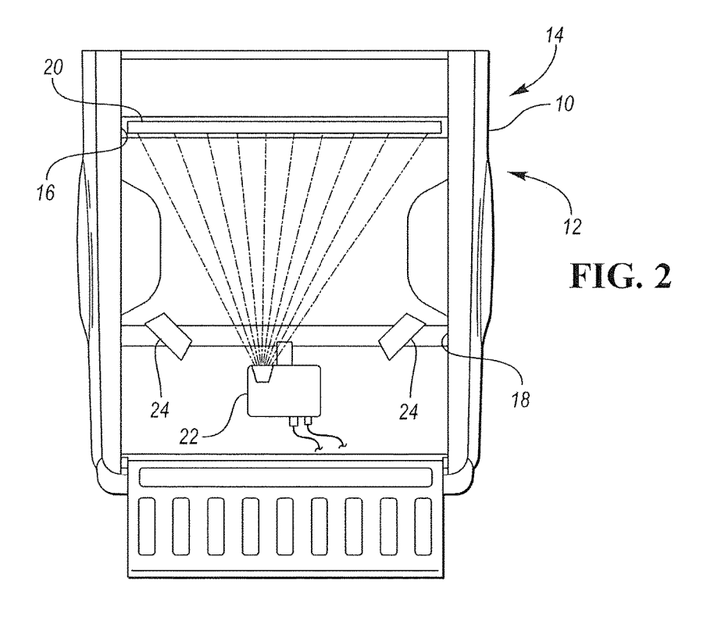
FIG. 2 is a top plan view of a pickup truck box having an audio-visual support system with audio-visual components secured thereto.

Referring to FIGS. 1 and 2, a pickup truck 10 is shown with a portable entertainment system 12 having a support assembly 14. The support assembly 14 may include a forward mount 16 and a rear mount 18. The forward and rear mounts 16, 18 may be formed, for example, of steel or aluminum extrusion. The forward and rear mounts 16, 18 may support components of the portable entertainment system 12, such as audio-video components. For example, the forward mount 16 may support a display device 20, such as a projector screen. The rear mount 18 may support a visual source device 22, such a video projector. The rear mount 18 may also support one or more audio devices 24, such as speakers.

Figure 3:
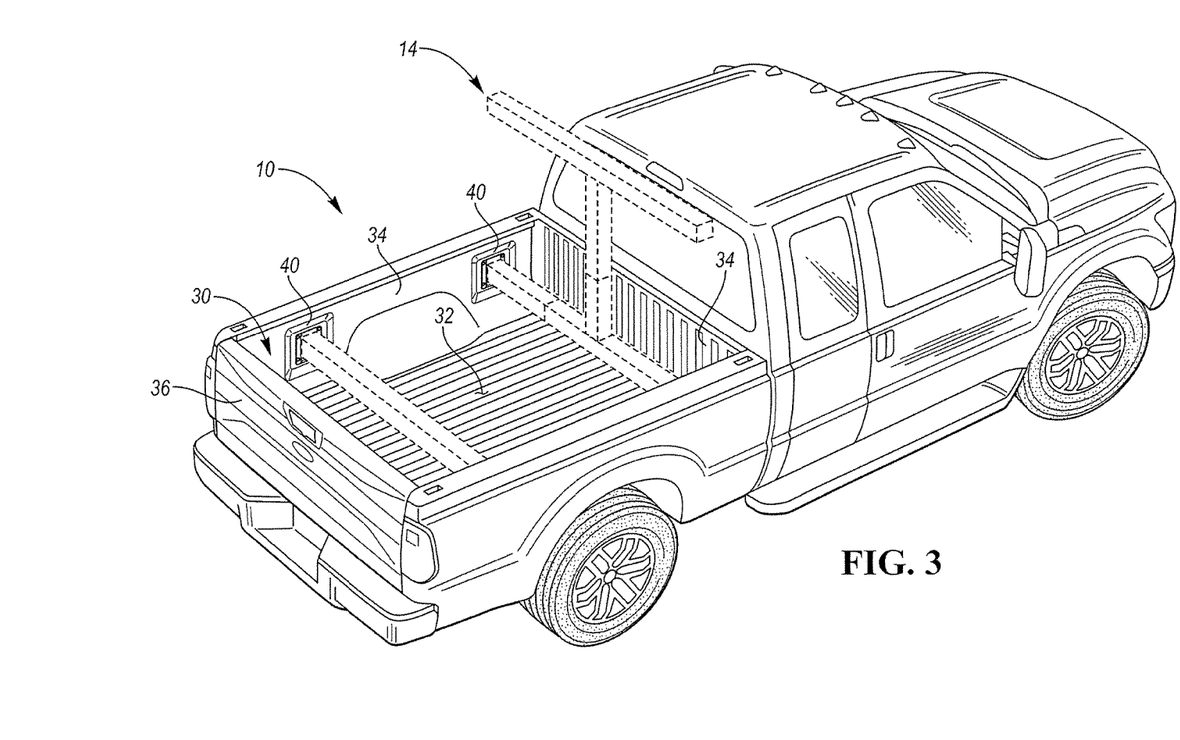
FIG. 3 is a perspective view of a pickup truck box having an audio-visual support system.

Referring to FIG. 3, the support assembly 14 (shown in dashed lines) may be secured within a cargo or truck box 30 of the truck 10. The truck box 30 may include a truck bed 32 and sidewalls 34 that extend about three sides of the truck bed 32. The truck box 30 may also include a tailgate 36 that may function as a sidewall on a fourth side of the truck bed 32. The components of the truck box 30, including the truck bed 32, sidewalls 34, and tailgate 36, may be made from a sheet metal material, including but not limited to, steel sheet or an aluminum alloy sheet.

The sidewalls 34 of the truck box 30 may include a plurality of recesses 40. The recesses 40 may provide added strength for supporting objects connected to the sidewalls 34. The recesses 40 may be offset into the sidewalls 34. The recesses 40 may each include a planar recessed portion that is disposed in a generally parallel orientation relative to the wall.

Figure 4:
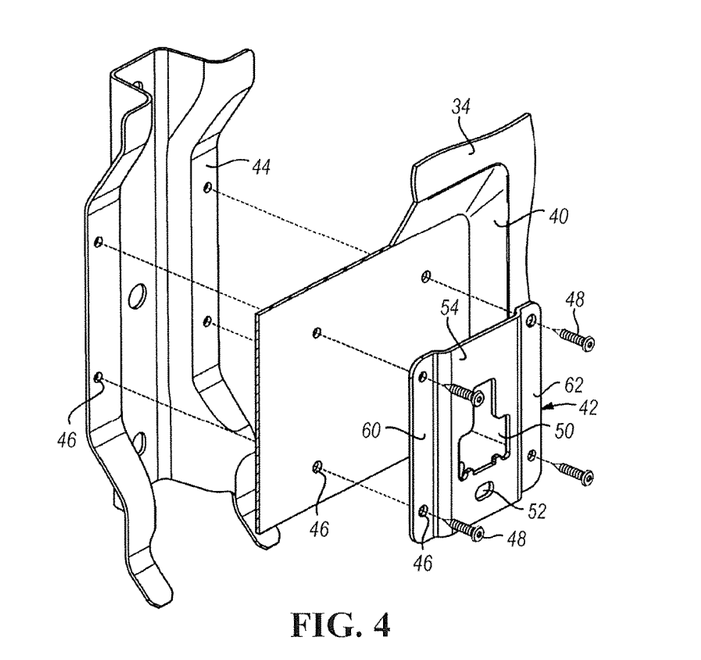
FIG. 4 is a fragmentary exploded perspective view of a recess in the truck bed wall and a reinforcement panel.
Figure 5:
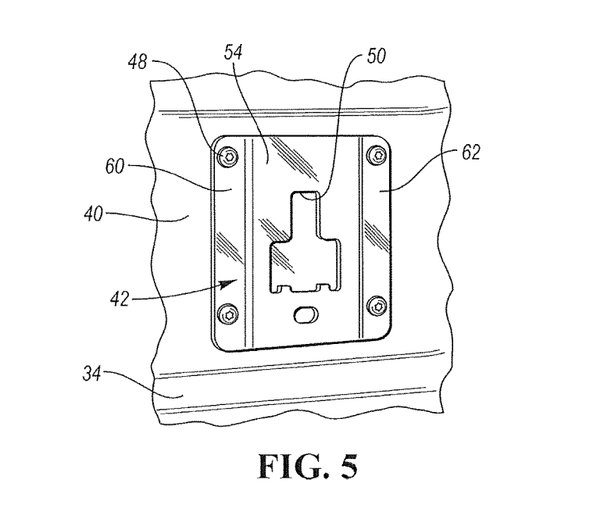
FIG. 5 is a side elevation view of a recess in the truck bed wall and a reinforcement panel.

Referring to FIGS. 4 and 5, an interface plate 42, or faceplate, may be disposed in each of the recesses 40. A reinforcement plate 44 may be attached to the opposite side of the sidewall 34 from the interface plate 42. A plurality of holes 46 may be drilled through the interface plate 42, sidewall 34, and reinforcement plate 44. A plurality of fasteners 48 may be inserted into the holes 46 to hold the interface plate 42 to the sidewall 34 and the reinforcement plate 44.

The interface plate 42 may include an inverted T-shaped opening 50, and may also or instead include a hook receiving opening 52 in a central body or area 54 of the interface plate 42. The interface plate 42 may define an opening that is attached to the recessed portion to define a lip. The lip is formed by the edges of the inverted T-shaped opening 50.

A first flange 60 and second flange 62 of the interface plate 42 may flank the central area 54. The first flange 60 and second flange 62 are secured by the fasteners 48 against the sidewalls 34. The central area 54 is spaced from the sidewall 34 to provide clearance between the central area 54 and the recess 40 formed in the sidewalls 34; for example, at a top portion of the central area 54 and behind the inverted T-shaped opening 50 and the hook receiving opening 52. The top portion of the central area 54 may be adapted to be engaged by, and support, a horizontal arm, as discussed in greater detail elsewhere herein.

Figure 6:
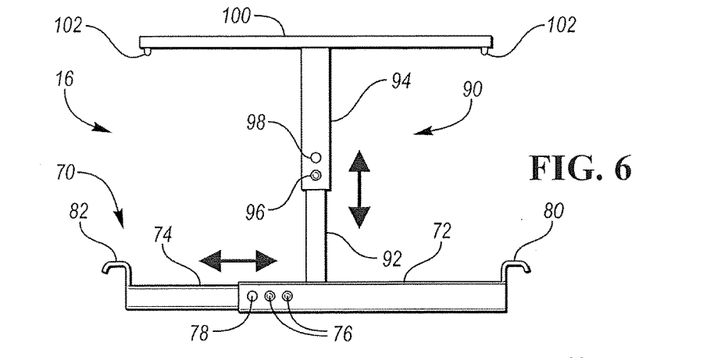
FIG. 6 is an elevation view a first mount.

Referring to FIG. 6, the forward mount 16 of the support assembly 14 may include a first horizontal arm, which may be referred to as a base arm or assembly 70. In at least one approach, the base arm 70 is a base member having a fixed length. In at least one other approach, the base arm 70 is an extendable base assembly having a first base member 72 and a second base member 74 slidably adjustable relative to the first base member 72. In this way, the base arm 70 may have an adjustable length (indicated by the directional arrows) and may be a telescopic tube or the like.

In at least one approach, a plurality of apertures 76 are formed through the first base member 72 of the base arm 70, and a depressible locking detent 78 is formed on the second base member 74. In at least another approach, a plurality of apertures are formed through the second base member 74 of the base arm 70, and a depressible locking detent is formed on the first base member 72. The locking detent 78 may selectively engage the apertures 76. In this way, a user may be permitted to selectively adjust and lock the length of the base arm 70. For example, a user may be permitted to adjust the length of the base arm 70 in the range of approximately 45 inches to approximately 90 inches. This range may permit a user to collapse the base arm 70 into a portable assembly, and may further permit the user to install the base arm 70 in a pickup truck having a common inside box width of approximately 68 inches. It should be understood that any suitable positioning and locking device may alternatively be utilized for this purpose.

The base arm 70 may further include securement members for securing the base arm 70 to the truck box 30. For example, the first base member 72 may be provided with a first hook 80, and the second base member 74 may be provided with a second hook 82. The first and second hooks 80, 82 may engage the interface plates 42 to secure the base arm 70 to the sidewalls 34 of the truck box 30. In at least one approach, the hooks are adapted to engage an interface plate 42 at a top surface of the central area 54 between the interface plate 42 and the recess 40. In at least another approach, the hooks are adapted to engage the interface plate 42 at the inverted T-shaped opening 50. In at least another approach, one or more of the hooks includes a first hook portion adapted to engage the interface plate 42 at the top surface of the central area 54, and a second hook portion adapted to engage the interface plate 42 at the inverted T-shaped opening 50.

In at least one approach, the hooks may engage the interface plates 42 such that portions of the hook are disposed between the first and second flanges 60, 62 of the interface plate 42, and between the central area 54 of the interface plate 42 and the recess 40 formed in the sidewall 34. The hooks may be locked to the interface plates 42; for example, using a tumbler lock. In at least one other approach, the hooks may engage a retaining plate secured to the interface plates 42.

The forward mount 16 of the support assembly 14 may also include a vertical support arm or assembly 90. The vertical support arm 90 may be integrally formed with, or may be secured to, the base arm 70 (e.g., to the first base member 72 or the second base member 74). In at least one approach, the vertical support arm 90 is a vertical support arm having a fixed length. In at least one other approach, the vertical support arm 90 is an extendable vertical support assembly having a first vertical member 92 and a second vertical member 94 slidably adjustable relative to the first vertical member 92. In this way, the vertical support arm 90 may have an adjustable length (indicated by the directional arrows) and may be a telescopic tube or the like.

In at least one approach, a plurality of apertures 96 are formed through the second vertical member 94 of the vertical support assembly 90, and a depressible locking detent 98 is formed on the first vertical member 92. In at least another approach, a plurality of apertures are formed through the first vertical member 92 of the vertical support assembly 90, and a depressible locking detent is formed on the second vertical member 94. The locking detent 98 may selectively engage the apertures 96. In this way, a user may be permitted to selectively adjust and lock the height of the vertical support assembly 90. For example, a user may be permitted to adjust the height of the vertical support assembly 90 in the range of approximately 24 inches to approximately 84 inches, and more particularly, in the range of approximately 48 inches to approximately 60 inches. It should be understood that any suitable positioning and locking device may alternatively be utilized for this purpose.

The vertical support assembly 90 may further include a transverse support arm or assembly 100. In at least one approach, the transverse support arm 100 is integrally formed with, or rigidly secured to the second vertical member 94. In at least one other approach, the transverse support arm 100 is a discrete member and may be removably secured to the second vertical member 94.

In at least one approach, the transverse support arm 100 is a transverse support member having a fixed length. In at least one other approach, the transverse support arm 100 is an extendable transverse support assembly having multiple members. The extendable transverse support assembly may, for example, be extendable through a system having apertures and a locking detent.

The second vertical member 94 and/or the transverse support arm 100 may be provided with one or more securement members 102. The securement members 102 may be, for example, a bolt, a hook, or other suitable fastener. The securement members 102 may also be a recess or aperture disposed in the transverse support arm 100 or second vertical member 94 for receiving a fastener.

Various display devices 20 may be secured to the forward mount 16 of the support assembly 14. In one approach, shown in FIG. 7, a first display device 20a may be a projector screen, and more particularly, may be a retractable projector screen. The projector screen may be secured to hooks 102a disposed on the transverse support arm 100. In this way, a projector screen may be supported for viewing by a user. In another approach, shown in FIG. 8, a second display device 20b may be a television, and more particularly, may be a flat panel television. The television may be secured to a television mount 102b disposed on the vertical support assembly 90. In this way, a television may be supported for viewing by a user.

Figure 9:
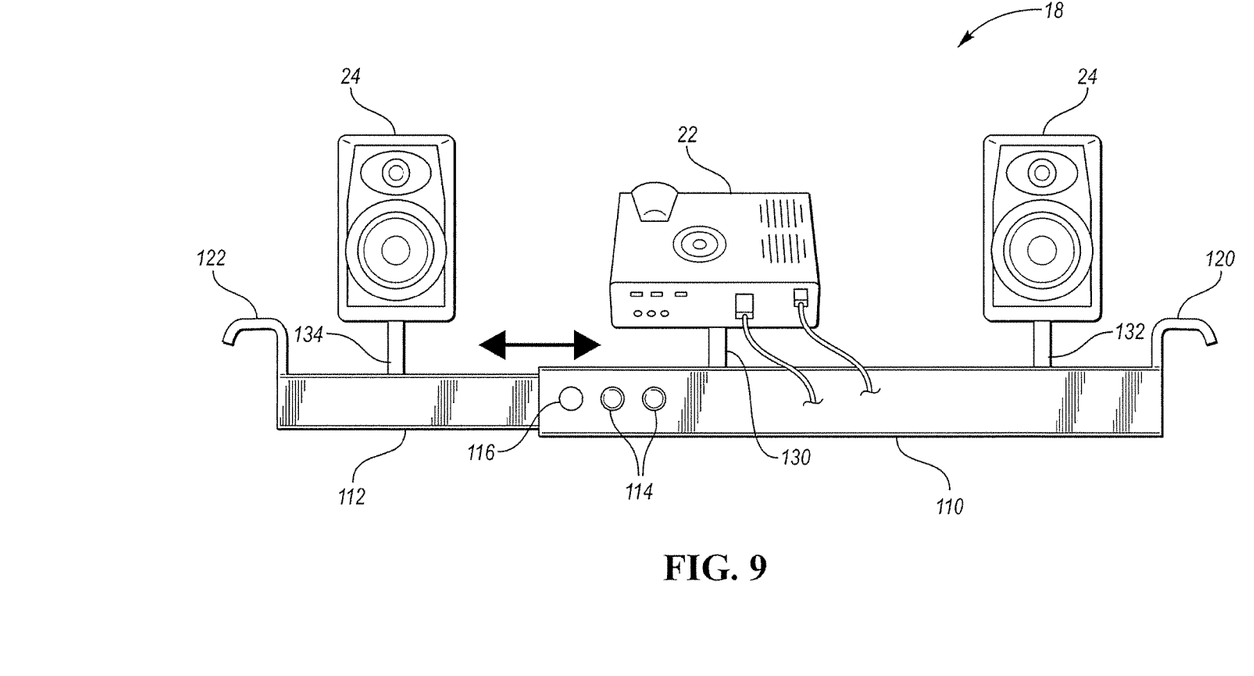
FIG. 9 is an elevation view of a second mount having audio-visual components secured thereto.

Referring to FIG. 9, the rear mount 18 of the support assembly 14 may define a second horizontal arm. In at least one approach, the rear mount 18 is a unitary member having a fixed length. In at least one other approach, the rear mount 18 is an extendable assembly having a third base member 110 and a fourth base member 112. In this way, the rear mount 18 may have an adjustable length (indicated by the directional arrows) and may be a telescopic tube or the like.

In at least one approach, a plurality of apertures 114 is formed through the third base member 110 of the rear mount 18, and a depressible locking detent 116 is formed on the fourth base member 112. In at least another approach, a plurality of apertures is formed through the fourth base member 112 of the rear mount 18, and a depressible locking detent is formed on the third base member 110. The locking detent 116 may selectively engage the apertures 114. In this way, similar to the base arm 70 of the front mount 16, a user may be permitted to selectively adjust and lock the length of the rear mount 18. For example, a user may be permitted to adjust the length of the rear mount 18 in the range of approximately 45 inches to approximately 90 inches. This range may permit a user to install the rear mount 18 in a pickup truck having a common inside box width of approximately 80 inches. It should be understood that any suitable positioning and locking device may alternatively be utilized for this purpose.

The rear mount 18 may further include securement members for securing the rear mount 18 to the truck box 30. For example, the third base member 110 may be provided with a third hook 120, and the fourth base member 112 may be provided with a fourth hook 122. The third and fourth hooks 120, 122 may engage the interface plates 42 to secure the rear mount 18 to the sidewalls 34 of the truck box 30. In at least one approach, the hooks are adapted to engage an interface plate 42 at a top surface of the central area 54 between the interface plate 42 and the recess 40. In at least another approach, the hooks are adapted to engage the interface plate 42 at the inverted T-shaped opening 50. In at least another approach, one or more of the hooks includes a first hook portion adapted to engage the interface plate 42 at the top surface of the central area 54, and a second hook portion adapted to engage the interface plate 42 at the inverted T-shaped opening 50. In this way, the hooks may engage the interface plates 42 such that portions of the hook are disposed between the first and second flanges 60, 62 of the interface plate 42, and between the central area 54 of the interface plate 42 and the recess 40 formed in the sidewall 34.

Figure 7:
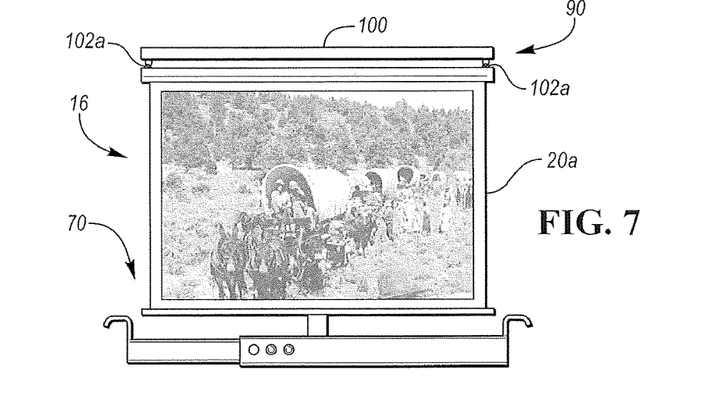
FIG. 7 is an elevation view the first mount having a first display device secured thereto.
Figure 8:
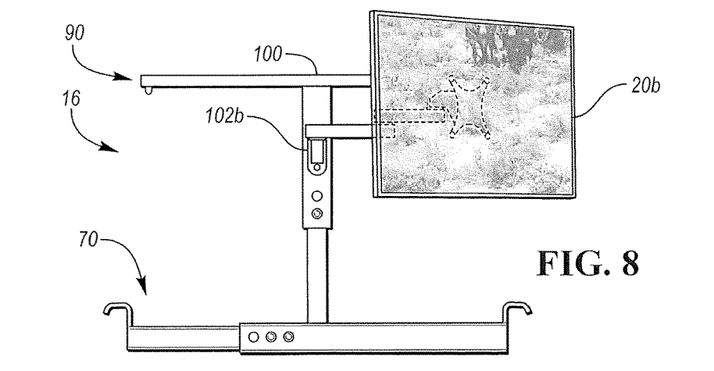
FIG. 8 is an elevation view the first mount having a second display device secured thereto.

The rear mount 18 may include one or more support member. The support structures may be adapted to support various entertainment components, such as audio/visual equipment. For example, the third base member 110 may include a first support member 130 and a second support member 132, and the fourth base member 112 may include a third support member 134. In one approach, the support members 130, 132, 134 plate and screw assemblies for removably securing components to the base members 110, 112. The first support member 130 may be adapted to support a video source device 22, such a video projector; for example, when the display device 20 is a projector screen 20a (e.g., as shown in FIG. 7). When the display device 20 is a television 20b (e.g., as shown in FIG. 8), the first support member 130 may not need to support a video source device 22. The second and third support members 132, 134 may be adapted to support audio devices 24, such as speakers.

In at least one approach, audio/visual equipment may be powered from a power supply located within the vehicle 10. For example, the video source device 22 and/or the audio devices 24 may be powered through a power outlet located in one or more sidewalls 34 of the truck box 30. In at least one other approach, audio/visual equipment may be powered from a power supply located outside of the vehicle 10.

In the secured position, the base arm 70 of the forward mount 16 may extend between opposing sidewalls 34 of the truck box 30 across the entire width, or substantially the entire width, of the truck box 30. Similarly, in the secured position, the rear mount 18 may extend between opposing sidewalls 34 of the truck box 30 across the entire width, or substantially the entire width, of the truck box 30. Further, due at least in part to the location of the interface face 42 along the height of the sidewalls 34, the forward mount 16 and the rear mount 18 may be maintained in spaced relation relative to the truck bed 32. For example, the base arm 70 of the forward mount 16, and the rear mount 18, may be spaced from the truck bed 32 in the range of approximately 4 inches to approximately 20 inches, and more particularly, in the range of approximately 8 inches to approximately 12 inches.

In at least one approach, the forward mount 16 of the support assembly 14 is disposed in the truck box 30 in closer proximity to the cab of the truck 10 such that the display device 20 faces the rear of the truck 10 (e.g., the tailgate 36), and the rear mount 18 is disposed in the truck box 30 in closer proximity to the rear of the truck 10 such that the source device 22 and/or the audio devices 24 face the front of the truck 10. In this way, a user may view the display device 20 while facing in a forward direction (relative to the orientation of the truck 10). In at least another approach, the rear mount 18 of the support assembly 14 is disposed in the truck box 30 in closer proximity to the cab of the truck 10 such that the source device 22 and/or the audio devices 24 face the rear of the truck 10 (e.g., the tailgate 36), and the forward mount 16 is disposed in the truck box 30 in closer proximity to the rear of the truck 10 such that the display device 20 faces the front of the truck 10. In this way, a user may view the display device 20 while facing in a rearward direction (relative to the orientation of the truck 10).

While exemplary embodiments are described above, it is not intended that these embodiments describe all possible forms encompassed by the claims. The words used in the specification are words of description rather than limitation, and it is understood that various changes may be made without departing from the spirit and scope of the disclosure. As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. An entertainment support system attached to a pickup truck having a plurality of receptacles in sidewalls of a truck box spaced above a truck bed, comprising:
    a mount including
        a T-member comprising a support for supporting a display device, and
        an inverted T-member having a vertical arm disposed in slidable engagement with the T-member, and a telescoping horizontal arm extending orthogonal to the vertical arm and adapted to engage the receptacles of the truck box.

2. The entertainment support system of claim 1 wherein the vertical arm of the inverted T-member is a first vertical arm, and wherein the T-member comprises a second vertical arm disposed in slidable engagement with the first vertical arm.

3. The entertainment support system of claim 2 wherein the first vertical arm and the second vertical arm define a telescoping vertical arm adapted to permit adjustment of the mount between a first vertical height and a second vertical height.

4. The entertainment support system of claim 2 wherein the T-member further comprises a transverse arm secured to the second vertical arm and extending substantially parallel to the telescoping horizontal arm of the inverted T-member.

5. The entertainment support system of claim 4 wherein the support for supporting the display device is disposed on the transverse arm.

6. The entertainment support system of claim 1 wherein the telescoping horizontal arm is a first telescoping horizontal arm adjustable between a first length and a second length.

7. The entertainment support system of claim 6 wherein the first telescoping horizontal arm comprises a first base member and a second base member slidably adjustable relative to the first base member.

8. The entertainment support system of claim 7 wherein the mount is a first mount, and wherein the entertainment support system further comprises a second mount including a second telescoping horizontal arm extending along a width of the truck box parallel to the first telescoping horizontal arm and spaced from the first telescoping horizontal arm along a length of the truck box.

9. The entertainment support system of claim 8 wherein the second telescoping horizontal arm is adjustable between a third length and a fourth length.

10. The entertainment support system of claim 9 wherein the second telescoping horizontal arm comprises a third base member and a fourth base member slidably adjustable relative to the third base member.

11. The entertainment support system of claim 10 wherein the second length and the fourth length substantially correspond to the width of the truck box.

12. The entertainment support system of claim 8 wherein the first telescoping horizontal arm and the second telescoping horizontal arm include hooks adapted to engage the receptacles of sidewalls of the truck box spaced above the truck bed such that the first telescoping horizontal arm and the second telescoping horizontal arm are spaced above the truck bed.

13. The entertainment support system of claim 12 wherein the receptacles include an interface plate secured to a sidewall, wherein the interface plate includes a central body spaced apart from a recess in the sidewall, and wherein the hooks are adapted to engage the central body.

14. The entertainment support system of claim 8 wherein the second telescoping horizontal arm includes a first support mount adapted to support a video source device and a second support mount adapted to support an audio device.

15. A method of assembling a portable entertainment system within a pickup truck including sidewalls having receptacles disposed above a truck bed, comprising:
    slidably adjusting a length of a telescoping horizontal arm assembly of an inverted T-member;
    securing opposing ends of the telescoping horizontal arm assembly to a first set of opposing receptacles;
    slidably translating a T-member relative to the inverted T-member along a telescoping vertical arm assembly; and
    securing a display device to the T-member.

16. The method of claim 15 wherein slidably adjusting a length of a telescoping horizontal arm assembly of an inverted T-member comprises:

slidably adjusting a first base member of the telescoping horizontal arm assembly relative to a second base member of the telescoping horizontal arm assembly to adjust the length of the telescoping horizontal arm assembly.

17. The method of claim 15 wherein slidably translating a T-member relative to the inverted T-member along a telescoping vertical arm assembly comprises:
slidably translating a first vertical arm of the T-member relative to a second vertical arm of the inverted T-member to adjust a height of the telescoping vertical arm assembly.

18. The method of claim 17 wherein securing the display device to the T-member comprises:
securing the display device to a transverse arm of the T-member, the transverse arm extending substantially orthogonal to the first vertical arm of the T-member.

19. The method of claim 15 further comprising:
slidably adjusting a length of a second telescoping horizontal arm assembly; and
securing opposing ends of the second telescoping horizontal arm assembly to a second set of opposing receptacles parallel to and spaced from the inverted T-member along a length of the sidewalls.

20. The method of claim 19 further comprising:
securing a video source device to the second telescoping horizontal arm assembly; and
securing an audio device to the second telescoping horizontal arm assembly.

* * * * *